United States Patent [19]

McVay

[11] Patent Number: 4,759,445
[45] Date of Patent: Jul. 26, 1988

[54] ADDITIVE PACKAGE FOR A METHOD FOR COMPOUNDING POLYMER FORMULATIONS

[76] Inventor: Malcolm S. C. McVay, 17925 Auburn Dr., Chagrin Falls, Ohio 44022

[21] Appl. No.: 14,148

[22] Filed: Feb. 12, 1987

Related U.S. Application Data

[63] Continuation of Ser. No. 572,612, Jan. 23, 1984, abandoned, which is a continuation of Ser. No. 329,311, Dec. 10, 1981, abandoned.

[51] Int. Cl.$^4$ ............................................. B65D 85/84
[52] U.S. Cl. .............................. 206/524.2; 206/524.3; 206/524.5
[58] Field of Search ............... 206/219, 447, 524.3, 206/216, 524.4, 524.5, 524.6, 524.7, 524.2; 220/462; 229/3.1; 427/155; 428/35, 318.4, 484

[56] References Cited

U.S. PATENT DOCUMENTS

| | | | |
|---|---|---|---|
| 532,954 | 1/1895 | Grimm | 229/3.1 |
| 2,618,384 | 11/1952 | Hatfield | 206/524.7 |
| 2,700,461 | 1/1955 | Smith | 206/0.5 |
| 2,791,326 | 5/1957 | Sparks et al. | 206/524.7 |
| 3,189,242 | 6/1965 | Orr | 229/3.1 |
| 3,329,306 | 7/1967 | Stein | 229/3.1 |
| 3,545,643 | 12/1970 | Higgins et al. | 206/447 |
| 3,648,882 | 3/1972 | Shelton | 220/462 |
| 3,784,005 | 1/1974 | McVay | 206/219 |
| 3,902,596 | 9/1975 | McVay | 206/219 |
| 4,008,347 | 2/1977 | Amberg et al. | 428/35 |

FOREIGN PATENT DOCUMENTS 0955079 4/1964 United Kingdom .

Primary Examiner—Jimmy G. Foster
Attorney, Agent, or Firm—Renner, Otto, Boisselle & Sklar

[57] ABSTRACT

A package for introducing additives into polymer formulations containing at least one component which is a solvent for the package, said package comprising a lid and a polystyrene foam container having an internal surface coating of a material which is non-reactive with and resistant to the additives but either a soluble in the solvent component of the resin or breaks down to a particulate form when the package is mixed with the resin formulation is disclosed. The packages of the present invention particularly are useful for compounding polyester resins, vinyl resins or rubber formulations to which are added materials which modify the physical and/or chemical properties of the formulation or of the cured product.

16 Claims, 1 Drawing Sheet

U.S. Patent
Jul. 26, 1988
4,759,445
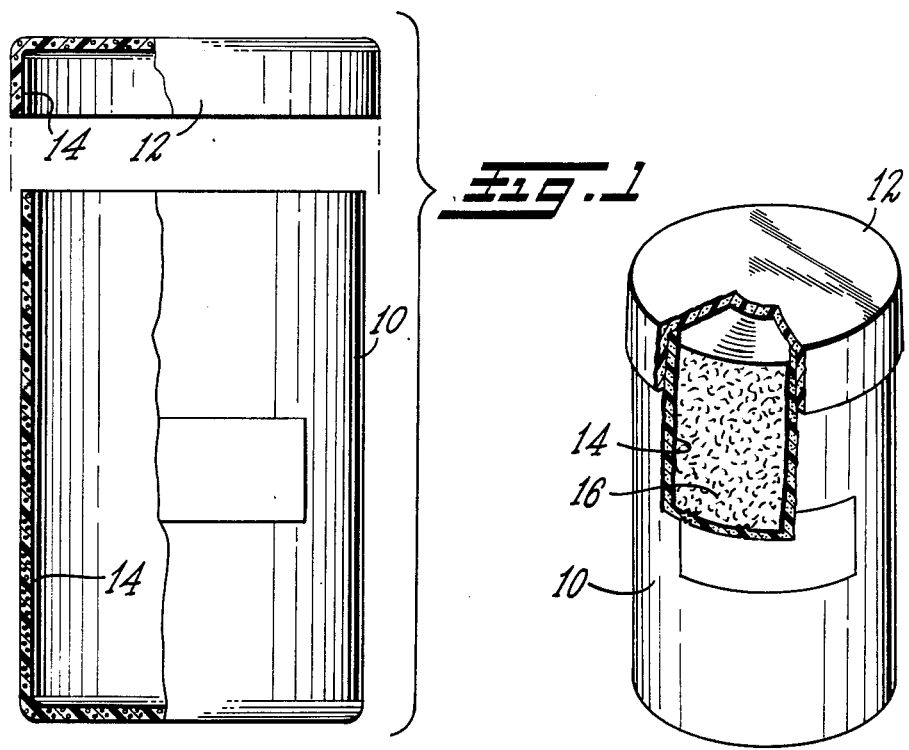
Fig. 1
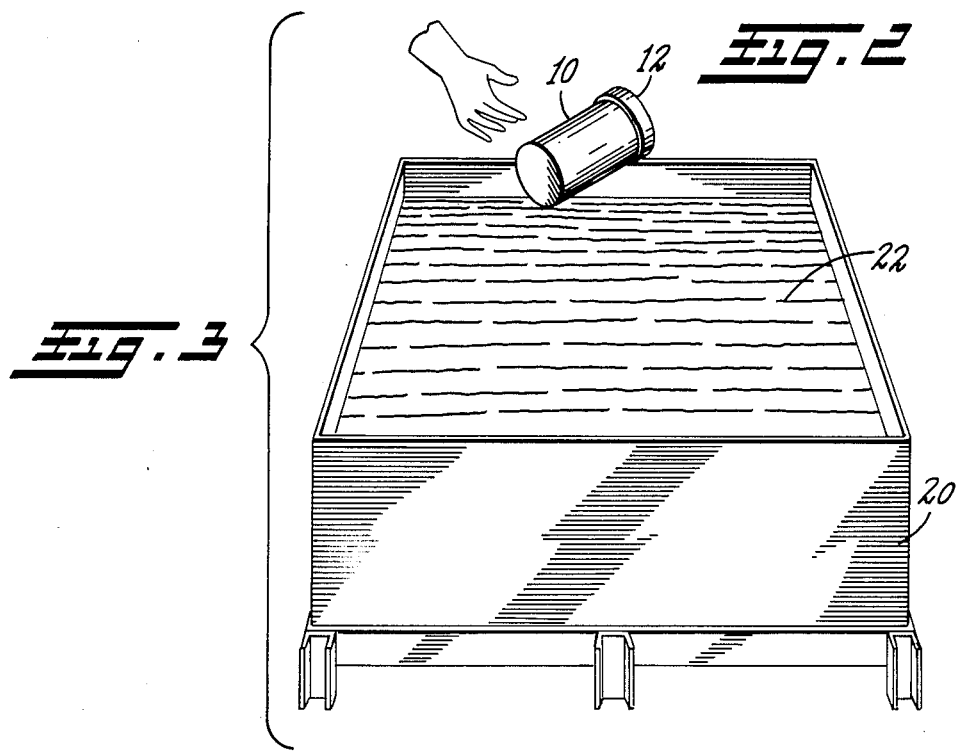
Fig. 2
Fig. 3

ADDITIVE PACKAGE FOR A METHOD FOR COMPOUNDING POLYMER FORMULATIONS

This is a continuation of co-pending application Ser. No. 572,612 filed on Jan. 23, 1984, abandoned, which is a continuation of Ser. No. 329,311, filed Dec. 10, 1981, abandoned.

BACKGROUND OF THE INVENTION

This invention relates to a package for some of the ingredients (additives) to be added to a polymer formulation, to packages containing additives for polymer formulations, and to a method of compounding polymer formulations using said packages. More particularly, the invention relates to packages for additives to be added to polymer formulations where the formulation contains at least one component which is a solvent for the package.

This invention relates generally to the compounding of any polymer formulation containing at least one component which is a solvent for the polystyrene package described below. The invention particularly is suitable for compounding polyester resin, vinyl resin or rubber formulations to which are added materials which modify the physical and/or chemical properties of the formulation or of the cured product. The term "additive" is used in this specification and claims to embrace any such materials which are added to the polymer formulations. Exemplary additives include catalysts, colorants, antioxidants, ultraviolet stabilizers, fillers, reinforcements, thixotropic agents, inhibitors, mold release agents, flame retardants, plasticizes, fungicides, biocides, silanes to improve adhesion of the product to substrates or reinforcing fibers, etc.

The compounding of polymers generally requires the maintenance of quantities of a variety of additives to be introduced into the resin batches in rather precise amounts. The potential for error in the selection of the particular additives and in the measurement of the amounts of each additive each time portions of additives must be taken from bulk reservoirs and introduced into the formulation is significant. Moreover, additives with short shelf lives may deteriorate before they can be used.

Some additives consist of suspensions of particles in liquid vehicles, and the particles may tend to settle out on standing. For example, sensitive catalysts such as the organic peroxides and azo compounds used in compounding polyester resin formulations are suspended in inert liquid vehicles, and, consequently, when a selected amount of suspension is removed from a bulk container, the actual concentration of the particles may vary depending on the amount of settling which has occurred.

Various approaches have been suggested in the prior art for solving the foregoing problems. One approach involves the packaging of the additives in a thin wall sealed additive package which is soluble in the resin formulation. In U.S. Pat. No. 3,784,005, I disclosed a novel and improved soluble additive package which comprised a packaged envelop consisting of a thin film of polystyrene or other polymer film which was soluble in the resin formulation. The package envelope was made of extremely thin film, preferably not more than about five mils in thickness and more preferably not more than about two mils in thickness. This envelope is readily soluble in the resin formulation. Because of its thickness, the envelope is formed within and supported by a rigid outer container. In use, the envelope is removed from the rigid container and deposited directly into the resin formulation batch. The method of forming such packages for additives is described in my earlier U.S. Pat. No. 3,896,600.

U.S. Pat. No. 3,902,596 also describes additives packages of the type described in U.S. Pat. No. 3,784,005, but which differ in the nature of the stabilizing vehicle utilized to suspend the sensitive catalyst. In this patent, the vehicle is described as being selected from the group consisting of castor oil, menhaden oil, coconut oil, cottonseed oil, soybean oil, peanut oil, linseed oil and fully saturated polyester resin.

Because some of the polymerization initiator catalysts such as the organic peroxide catalyst and organic azo catalyst are explosively decomposable upon being subject to shock, heat, friction or contamination with a reactive substance resulting in the formation of gaseous reaction products at an explosive rate, it is desirable and necessary to suspend the catalyst in liquid stabilizing vehicles as more fully described below. For example, benzoyl peroxide and organic azo catalysts such as, for example, 2,2-azo(bis-isobutylnitrile) are potentially explosively decomposable polymerization initiator catalyst, and these generally are handled as mixtures of up to about 60% by weight of catalyst suspended in inert stabilizing vehicle such as a phthalate ester which substantially reduces the explosion hazard posed by the catalyst. However, some of the conventional liquid stabilizing vehicles for sensitive catalysts rapidly attack and destroy the thin film of the package envelope used in the additive packages described above.

For example, in British Pat. No. 955,079, there is described a technique for suspending peroxide catalyst particles in a vehicle such as tricresyl phosphate, butyl phthalate or dioctylphthalate. While such materials serve as vehicles for sensitive catalysts and effectively eliminate the dangers of explosion, these materials attack polystyrene and other polymer films thereby precluding the use of thin polystyrene film additive packages for such sensitive catalyst and their stabilizing vehicles when reasonable shelf life is required. When longer shelf life is required, the catalysts must be suspended in a vehicle which will not attack polystyrene and other films used to form the additive package.

Although the additive packages utilizing the thin-walled plastic envelope described in my earlier U.S. Pat. Nos. 3,784,005; 3,896,600 and 3,902,596 have been successfully used as packages for sensitive catalysts, such additive packages do require the somewhat tedious preparation of the thin-walled plastic envelope within the rigid container, and, moreover, after the plastic envelope has been removed from the rigid container and introduced into a resin formulation, the rigid container must be discarded, or if reusable, returned to the manufacturer. Accordingly, the use of a rigid container in accordance with the prior art is a factor in the cost of the additive package, and because it must either be discarded or returned, presents a burdensome task for the user.

Although U.S. Pat. Nos. 3,784,005 and 3,896,600 suggest the possibility of using a rigid all polystyrene foam container, such containers have not, to my knowledge, been used commercially because the stabilizing vehicles used to suspend the catalyst exhibit strong tendencies to penetrate into the walls of the polystyrene foam container. Such penetration or "wicking" by capillary action is an undesirable occurrence.

SUMMARY OF THE INVENTION

In accordance with the present invention, there is provided a polystyrene package for shipping and introducing additives, including a sensitive catalyst suspended in a stabilizing vehicle, to polymer formulations containing at least one component which is a solvent for the polystyrene, said package comprising a lid and a foamed polystyrene container having an internal surface coating of a material which is non-reactive with and resistant to the additives and stabilizing vehicle but either is soluble in the solvent component of the resin or breaks down to a particulate form when the package is mixed with the polymer formulation. It has been found that the entire polystyrene package of the present invention can be added to the formulations containing a component which is a solvent for the polystyrene and preferably the internal surface coating whereby the stabilizing vehicle, internal surface coating and foamed polystyrene are dissolved and the additives either are dissolved or suspended on mixing with the formulation. In this manner, the formulator is provided with a simple technique for introducing the necessary additives, including sensitive catalysts, to polymer formulations, and the formulator is not faced with the problem of discarding or returning rigid containers.

BRIEF DESCRIPTION OF DRAWINGS

In the annexed drawings:

FIG. 1 shows a partial section view of a package in accordance with the invention;

FIG. 2 shows a partial section view of a package containing additives in accordance with the invention; and FIG. 3 shows schematically the use of an additive package in accordance with the invention.

DESCRIPTION OF THE PREFERRED EMBODIMENTS

It now has been found that packages can be prepared for shipping and introducing additives, including sensitive catalysts which are suspended in a stabilizing vehicle, to polymer formulations containing at least one component which is a solvent for the polystyrene. Said package comprises a lid and a foamed polystyrene container having an internal surface coating of a material which is non-reactive with and resistant to the additives and stabilizing vehicle, but either is soluble in the solvent component of the formulation or breaks down to a particulate form when the package is mixed with the formulation. The amount of mixing which occurs when additives are mixed with polymer formulations is sufficient to break the package into pieces which on further mixing will dissolve in the component of the formulation which is a solvent for polystyrene. When the package is added to the formulation and is broken up by the mixing action, the additives contained in the package are brought into contact with the components of the formulation and intimately mixed with the formulation. The internal surface coating of the package also is broken down into a particulate form when the package is mixed with the formulation, and the particulate material either dissolves in the component of the formulation which is a solvent for the coating material or the particulate material becomes suspended in the formulation. Because the internal surface coating material is used in such small quantities when compared to the volume of polymer formulation, the presence of non-soluble dispersed particulate coating material in the formulation is not deleterious to the desired properties. However, in a preferred embodiment, the package comprises a polystyrene container having an internal surface coating of a material which is soluble in the solvent component of the polymer formulation.

The polystyrene packages of the invention, in one embodiment, comprise a polystyrene foam container having an internal surface coating as described above. In another embodiment of the invention, the polystyrene package comprising a polystyrene foam container having an internal surface coating as described above will contain at least one additive normally used in polymer formulations. In another embodiment the package of the invention will contain additives including a catalyst for resin formulations, and the catalyst is dispersed in an inert liquid vehicle which will not dissolve or react with the internal surface coating. Such additive containing packages can be transported to a variety of resin formulators for addition to various polymer systems depending upon the particular additives contained in the polystyrene packages. Thus, the packages of the invention can be custom formulated to satisfy the needs of particular polymer formulators and processors.

This invention can be described in more detail in connection with the preferred embodiments thereof which are illustrated in the attached drawings. FIG. 1 illustrates a partial section view of a package in accordance with the invention which comprises a container 10 and a lid 12 wherein both the container 10 and lid 12 are made of polystyrene foam. In this embodiment, both the container 10 and the lid 12 have an internal surface coating 14, of a material as defined herein.

FIG. 2 illustrates another embodiment of the invention wherein the package similar to the package shown in FIG. 1 is filled with additive material 16. As mentioned above, the nature of the additive material 16 contained in container 10 can be tailored to the needs of individual formulators.

When the package is to be used by the formulator, as shown in FIG. 3, the entire package, including container 10 and lid 12, simply is introduced into a mixing vessel 20 which contains the polymer formulation 22. The container 10 and lid 12, being made of polystyrene foam, generally not more than about 2 or 3 cm. in thickness, readily can be utilized in the packages of the invention, and, when introduced into a polymer formulation will readily dissolve or be broken up into smaller pieces which will dissolve in the solvent component of the formulation. The density and thickness of the polystyrene container should be sufficient to provide a container which will withstand the rigors of shipping and handling prior to being added to a polymer formulation. Conversely, the density and thickness of the polystyrene used in the container should be no greater than is necessary for proper shipping characteristics so that the container readily will dissolve in the formulation or be broken up during the mixing operation. Accordingly, the density and thickness of the polystyrene used in the containers have no set parameters but can be varied by those skilled in the art in accordance with the projected use of the package.

Examples of polystyrene containers which can be used in the formation of the packages of the invention include polystyrene cups of various types such as are used presently in commerce for consumable liquids such as hot and cold drinks, and these containers may vary in size of from about one or two fluid ounces to about 36 or even 50 fluid ounces. Larger sized polystyrene containers such as containers normally referred to as ice buckets or ice chests of varying sizes of up to 30 or 50 gallons can be utilized as the containers of the invention. The lid 12, used in combination with the container 10 to form the package of the invention, preferably will be made of a polystyrene foam, and the thickness and density of the polystyrene foam used in the lid may be the same or different from the thickness and density of the polystyrene used in the container.

The internal surface coating 14 of the container and, preferably on the lid, is a material which is non-reactive with and resistant to the additives and stabilizing vehicle to be included in the container, and the internal surface coating material either is soluble in the solvent component of the polymer formulation or easily breaks down to a particulate form when the package is mixed with the polymer formulation. The coating material should be non-reactive with and resistant to the additives and stabilizing vehicle to provide the desired barrier between the catalyst and/or vehicle and the polystyrene container walls until the package of the invention has been mixed with the polymer formulation and there is no longer any need to isolate the additives from contact with the polystyrene and the polymer formulation. Additionally, the internal surface coating should be of a material which either is soluble in the solvent component of the formulation or which easily breaks down to a particulate form when the package is mixed with the formulation. Preferably, the coating material is one which is soluble in the solvent component of the formulation.

Materials which are useful for the internal surface coating include waxes, synthetic polymer resins such as polyester resins, high molecular weight vinyl esters and epoxy resins. The waxes which are useful as coatings in accordance with the method of the invention may be natural or synthetic waxes. Examples of natural waxes include animal waxes, vegetable waxes and mineral waxes. Examples of animal waxes include beeswax, spermaceti, lanolin and shellac wax. Examples of vegetable waxes include carnauba, candelilla, bayberry, sugarcane, castor, esparto and flax. Examples of mineral waxes include fossil or earth waxes such as montan and petroleum waxes such as paraffin, micro-crystalline waxes and oxidized micro-crystalline waxes. Synthetic waxes also may be useful as coatings in accordance with the present invention, and these synthetic waxes include ethylenic polymers and polyol ether-esters such as "Carbowax" and sorbitol or chlorinated synthetic waxes such as chlorinated paraffins, for example, chlorinated naphthalene and "Chlorwax" a commercially available chlorinated paraffin oil from Diamond Shamrock Co.

In lieu of the waxes described above, other coating materials which are soluble in the solvent component of the polymer formulation or which are sufficiently brittle to result in fracturing of the coating and the formation of a powder when the package of the invention is mixed with the resin formulation. Commercially available polymeric materials may be utilized as such coatings and these would include, for example, polyester resins, high molecular weight vinyl esters and epoxy resins.

The thickness of the internal surface coating should be sufficient to resist penetration of the additives and stabilizing vehicle into the walls of the polystyrene container. Generally, the thickness of the coating will range from about 0.5 to about 3 mils. The internal surface coating can be deposited by any of the well known techniques for depositing coatings on solid materials. For example, a liquid material (with or without solvent) can be sprayed onto the inner walls of the container and allowed to dry or cool to a solid coating. Alternatively, a liquid material, such as melted wax, can be placed inside of the container and the container rotated slowly to leave a film of the wax on the internal surface as the wax cools. Other methods will be apparent to those skilled in the art.

Although the lid 12 of the package of the invention is shown in FIGS. 1-3 as a preformed cap-like structure made of cellular material such as polystyrene and having an internal surface coating 14, other types of lids may be utilized in the packages of the invention so long as the lid exhibits the desired strength to withstand the rigors of shipping and extended storage. In one embodiment of the invention the lid used in the package could be composed of a material having alternative desirable properties such as strength to provide additional strength to the overall package, and if such lid will not dissolve in the solvent component of the resin formulation and/or will not break down into a particulate material on mixing, the lid may be discarded. In another alternative, the lid may comprise a sheet of film material of sufficient strength to withstand the rigors of shipping and storage, but which is soluble in the solvent component of the resin formulation. Such film could be attached to the container in a manner to provide a seal to prevent any of the contents of the container from spilling or escaping from the container. For example, such seals can be effected by heat sealing or adhesive bonding or simply in some instances by tying with a tie cord.

When the package of the invention is to be used, as shown in FIG. 3, the entire package including container 10 and lid 12 is simply added to the mixing vat 20 which contains the polymer formulation 22. Since the container 10 is constructed of polystyrene, it will dissolve in the formulation which contains a solvent for polystyrene. If the lid also is constructed of polystyrene foam, and this is preferred, the lid also will dissolve in the solvent. As mentioned above, if the lid 12 is composed of a material which is not soluble in the solvent component of the polymer formulation, such lid may be removed from the package prior to introduction of the package into the formulation and discarded. Alternatively, such non-soluble lid may be added to the formulation if the lid is of a construction which easily breaks up into small particles during the mixing operation.

As the polystyrene container and lid dissolve in the polymer formulation, the formulation generally is being subjected to mixing conditions which further facilitates the dissolving of the polystyrene in the formulation and/or the breaking up of the polystyrene package into particulate form. Similarly, during this procedure, the internal surface coating either is being dissolved in the solvent of the formulation or is being broken up into a particulate form as a result of the mixing action which is occurring in the mixing vat.

In accordance with another aspect of the present invention, there is provided, in a method of compounding a polymer formulation containing a solvent component for the package with at least one additive, the steps comprising introducing into the formulation a measured amount of at least one additive which is contained in the package of the invention, and admixing the formulation and the package with its contents until the entire package dissolves in the solvent component of the polymer formulation or the package is broken up into particulate form and the additive is substantially uniformly dispersed throughout the formulation.

The packages of the present invention are usable with any polymer formulation which contains one or more components in which the polystyrene foam will dissolve. That is, the formulation should contain at least one compound which is a solvent for the polystyrene foam. As an example of such solvents, polystyrene foam will dissolve in aromatic compounds, naphthenic oils, solvents such as cycloparaffins and in esters.

The present invention is useful with thermosetting or thermoplastic polymer formulations such as polyester resins, vinyl resins and elastomers. The invention is particularly useful with polyester resin formulations, that is, those resins formed by the esterification of an unsaturated polycarboxylic acid and a polyhydric alcohol. Examples of alpha, beta-unsaturated polybasic acids and anhydrides include maleic anhydride, fumaric, chloromaleic, itaconic and citraconic acids including mixtures thereof. Up to about 75 mol percent of the unsaturated acid or anhydride can be replaced by saturated, that is, non alpha,beta-ethylenically unsaturated dicarboxylic acids or anhydrides such as phthalic, tetrahydrophthalic or hexahydrophthalic acids or anhydrides, isophthalic, chlorendic, succinic, adipic, sebasic acids, etc. Examples of polyhydric alcohols which are utilized in the formation of polyester resins include ethylene glycol, propylene glycol, butylene glycol, diethylene glycol and triethylene glycol or mixtures thereof.

The unsaturated polyester formulations generally will contain as one component, or be dissolved in, at least one copolymerizable monomer containing a terminal vinyl group which preferably is connected to an electronegative group such as a phenyl group. Examples of such vinyl compounds include styrene, hydrocarbon ring-substituted styrenes such as vinyl toluene, t-butyl styrene, etc. Up to 50% of the copolymerizable ethylenically unsaturated monomer can be replaced by a lower alkyl ester of acrylic or methacrylic acid, alphamethyl styrene, cyclic acrylates and methacrylates, halogenated styrenes, diallyl phthalate, etc.

The vinyl resin formulations which can be prepared with the additive packages of this invention may be vinyl esters such as polyvinyl acetal and polyvinyl acetate, polyvinyl alcohol and polyvinyl halides.

The vinyl halide polymers can be of the type obtained by polymerizing a polymerizable vinyl halide monomer including mixtures of these monomers, such as vinyl fluoride, vinyl chloride, and vinyl bromide, and copolymers of a major (total) amount of one or more of these vinyl halide monomers and a minor amount, preferably not over 15%, of at least one other copolymerizable monomeric material having from one to two polymerizable $H_2C=C<$ groups. Examples of monomers copolymerizable with these vinyl halide monomer(s) in minor amounts are vinyl acetate, vinylidene fluoride, vinylidene chloride, vinylidene bromide, allyl alcohol, 3-butene-1-ol, phenyl vinyl ether, allyl acetone, diallyl phthalate, diallyl malonate, diallyl malate, diallyl phthalate, divinyl ether, trichlorofluoroethylene, diallyl ether, acrylonitrile, methacrylonitrile, chloroacrylonitrile and the like and mixtures thereof. It is understood that the term "polymer" includes copolymer, interpolymer, terpolymer and graft polymer, etc. Mixtures of these polymers, copolymers, and the like can be used.

Preferred are polymers prepared from vinyl chloride, or a major amount by weight of vinyl chloride and a minor amount by weight of vinylidene chloride or vinyl acetate, for example a polymer of from about 86 to 98% by weight of vinyl chloride and from about 14 to 2% by weight of vinyl acetate. The vinyl halide monomers have the formula

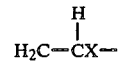

where X is fluorine, chlorine or bromine.

The additive packages of this invention also are useful in compounding elastomer or rubber formulations. The elastomers may be either unvulcanized thermoplastic elastomers or vulcanized thermosetting elastomers. Specific examples of such elastomers include polychloroprene (neoprene), sodium polysulfide, butadiene-styrene copolymers (SBR), acrylonitrile-butadiene copolymers (nitrile rubber), ethylene-propylene-diene rubbers (EPDM), copolymer of isobutylene and isoprene (butyl rubber), polysiloxene (silicone), polyurethane, etc. In general, sulfur is used for vulcanization of the unsaturated polymers whereas peroxides, quinones, metallic oxides (e.g., ZnO) or diisocyanates, effect vulcanization of the saturated types.

Additives which may be packaged and used in the compounding of polymer formulations utilizing the packages of the invention include catalysts, vulcanizing agents, colorants, pigments, ultraviolet stabilizers, fillers, fibrous reinforcement materials, thixotropic agents, mold release agents, fire retardants, plasticizers, thickening agents, inhibitors, coupling compounds to improve adhesion of the polymers to fibrous substrates, etc.

The catalysts which may be included in the packages of the invention may be any of the well known catalysts useful for polymerizing, vulcanizing and curing various polymer formulations. Organic peroxide and azocatalysts are useful particularly in polyester resin formulations, and these include compounds such as benzoyl peroxide, t-butyl peroctoate, di-t-butyl peroctoate, t-butyl perbenzoate, cyclohexane peroxide, di-t-butyl peroxide, 2,2-azo(bis-isobutyronitrile) etc. Sulfur can be included in the packages of the invention as a vulcanizing agent for rubber.

Other additives which may be included in the packages of the invention include well known plasticizers such as dioctyl phthalate, tricresyl phosphate, the nonmigratory polyester plasticizers, the Paraplexes, di-2-ethyl butyl azelate, dipropylene glycol dibenzoate, chlorinated biphenyl, epoxy type plasticizers, triethylene glycol di-(2-ethyl hexoate), chlorinated paraffin, n-butyl acetyl ricinoleate, butyl acetoxy stearate, and others well known to the art. Pigments such as titanium dioxide, carbon black, iron oxide, chrome base, phtholocyanine blue or green, cobalt base; antioxidants such as p-benzyl quinone, catechol hydroquinone, arylamines, alkylated phenols, 2,6-di-t-butyl-p cresol; flame retardants such as antimony oxide, chlorinated paraffin, zinc borate and halogenated polymers; fillers such as calcium carbonate, wood, cellulose, glass fibers and metal flakes; thixotropic agents such as magnesium oxide or hydroxide, formed silica and calcium silicate; coupling compounds such as silanes and titanates; stabilizers and antimicrobials such as zinc, cadmium, barium and mercury containing compounds; and rubbing material such as powdered copolymer of butadiene-acrylonitrile and styrene-acrylonitrile copolymer are examples of other conventional additives for polymer formulations such as polyester resins, vinyls and elastomers.

It is preferred that the additives be non-reactive with the internal surface coating of the container and lid. Alternatively, when the additive is reactive with the internal surface coating, the reactive additive can be dispersed or suspended in a stabilizing vehicle to prevent interaction of the additive with the material forming the internal surface coating. The stabilizing vehicle should dissolve or otherwise dissipate when the additive package is admixed with the polymer formulation. Examples of stabilizing vehicles which are useful in the additive packages of this invention include mineral oil, castor oil, menhaden oil, coconut oil, cottonseed oil, olive oil, soy bean oil, peanut oil, linseed oil, and fully unsaturated polyester resins.

For example, a peroxide catalyst such as benzoyl peroxide or cyclohexanol peroxide may be made into a paste with a mineral oil vehicle rather than be dissolved in a conventional carrier such as dibutylphthalate or tricresylphthalate which could itself attack the internal surface coating and/or polystyrene foam. In general, the amount of catalyst present in the package will be that amount which is sufficient to provide a quantity of catalyst in the resin formulation of from about 0.1 to about 3 to 5 percent based on the total resin formulation.

The present invention also contemplates additive packages which contain a plurality of additives of the type mentioned above. Where the additives are compatible and non-reactive with each other, they may be admixed directly with each other and placed in the package. In some instances, the compatibility of additives is obtained only when they are in a dry state, and in this event, care should be exercised to place dry additives in the package and thoroughly mixing the additives with the stabilizing vehicle in the absence of any substantial amount of moisture.

Where the additives to be introduced in a particular polymer formulation may interact with each other, as for example, many colorants will react with peroxidd catalysts, it is contemplated that these additives be physically separated within an additive package of the invention. This can be accomplished by utilizing one or more small packages within a larger package. Thus, in one embodiment of this invention, it is contemplated that one large styrofoam container having an internal surface coating of the type described above could be filled with one or more additives, and a smaller polystyrene foam container having an internal surface coating of the type described above could be filled with another additive such as, for example, the catalyst suspended in a stabilizing vehicle. This smaller package could be deposited within the additive mixture contained in the larger container for shipping and eventual introduction into the polymer formulation. Accordingly, when the large package is added to a polymer formulation and dissolves, the solvent of the resin formulation eventually would reach the internal package and dissolve that package thus resulting in the release of the catalyst. A specific example of this embodiment utilizes a large styrofoam container such as an ice bucket which is filled with a paste dispersion of calcium or zinc stearate. A peroxide catalyst suspended in a stabilizing vehicle such as mineral oil is placed within a second but smaller package such as a polystyrene foam coffee cup having an internal surface coating of a material as described above, and this peroxide-containing coffee cup then can be deposited within the larger paste matrix contained in the ice chest. This type of package provides additional strength and protection for shipping, and also provides an additional safety feature in the event that small amounts of the catalyst penetrate the small container since the catalyst would not reach the inside wall of the larger container because of the equalizing pressure.

The present invention may be utilized advantageously for the incorporation of additives into polymer systems which are hygroscopic or otherwise are unstable or have a tendency to react with the atmosphere. For example, viscosity control agents or thickeners utilized in resin formulations designed for sheet molding, bulk molding and low profile applications conventionally include calcium oxide, calcium hydroxide, magnesium oxide and magnesium hydroxide. Because of the hygroscopic nature of these chemicals, they are somewhat difficult to weight accurately if they are exposed to the atmosphere. Furthermore, since the absorption of water tends to cause the materials to cake, it becomes difficult to uniformly distribute them throughout the resin. This problem can be eliminated in accordance with the present invention by weighting the viscosity control agents when dry and maintaining them in a dry state prior to mixing with the stabilizing vehicle. Dispersion of such materials within the stabilizing vehicle reduces the contact of such materials with air and, accordingly, the amount of water which the materials tend to absorb.

Although the introduction of the packages of the invention into polymer formulations may introduce a "contaminant", the quantity of contaminant dissolved or dispersed within the formulation is so small that it has no discernible influence on the appearance or physical properties of the cured resins. If difficulty is observed in the dissolution of the package on mixing with the formulation, it is, of course, desirable to separate any large suspended particles by, for example, filtration prior to effecting the curing of the formulation.

As mentioned above, the choice of a particular internal surface coating and vehicle for the packages of the invention will be determined by the nature of the additives. For example, for organic peroxide and azo catalyst, mineral oil is a satisfactory vehicle and paraffin wax is an acceptable surface coating. However, if the additive package contains plasticizers commonly used with peroxides such as dioctyl phthalate, then the internal surface coating must be more resistant than paraffins and may be replaced by chlorinated paraffins. When the additives are even more reactive such as, for example, perketals, percarbonates and peresters, it is preferrable to use a more resistant internal surface coating such as polyester resins, high molecular weight vinyl esters or epoxy resins.

Although it is preferred to add the packages of this invention to a polymer formulation containing at least one solvent for the package whereby the package is dissolved in the formulation, the additive packages of this invention may be dissolved in a solvent compatible with the polymer formulation, and this solution then added to the formulation. In such instances, the solvent may be same as one of the components of the polymer formulation or a solvent which is miscible and compatible with the formulation.

Some specific examples of additive combinations which can be contained in the additive packages of the invention include the following:

|  | Parts per Hundred |
| --- | --- |
| Example 1 | |
| Carbon black | 25 |
| Antimony oxide | 20 |
| Mineral oil | 55 |
| Example 2 | |
| Iron oxide black | 17 |
| Benzoyl peroxide | 10 |
| Calcium stearate | 33 |
| Mineral oil | 40 |
| Example 3 | |
| Benzoyl peroxide | 50 |
| Mineral oil | 50 |
| Example 4 | |
| Calcium stearate | 20 |
| Antimony pentoxide | 20 |
| Zinc borate | 20 |
| Mineral oil | 40 |
| Example 5 | |
| Zinc stearate | 10 |
| Carbon black | 2 |
| Dioctyl phthalate | 8 |
| Calcium carbonate | 40 |
| Castor oil | 40 |

The present invention has been described in connection with certain specific embodiments. It will be appreciated, however, that modifications of the disclosed invention will be suggested to those skilled in the art upon reading this disclosure. For example, the packages of the present invention may have other than cylindrical shapes and may be rectangular or square in cross-section.

I claim:

1. A polystyrene package for introducing additives into polymer formulations containing at least one component which is a solvent for polystyrene, said package comprising,
   (a) a polystyrene foam container having
   (b) a lid, and
   (c) an internal surface coating of a material which is non-reactive with and resistant to the additives, but is soluble in the solvent component of the polymer formulation when the package is mixed with the polymer formulation, and containing
   (d) at least one additive for said polymer formulation.

2. The package of claim 1 wherein the additive includes a sensitive catalyst suspended in a stabilizing vehicle.

3. The package of claim 2 wherein the sensitive catalyst is an organic peroxide, an organic azo compound, a perketal, a percarbonate, a perester or a mixture thereof.

4. The package of claim 1 wherein the solvent component of the polymer formulation is a vinyl monomer.

5. The package of claim 1 wherein the material of the internal surface coating is a paraffin wax, a halogenated paraffin wax, a polyester resin, a high molecular weight vinyl ester or an epoxy resin.

6. The package of claim 1 wherein the additives include compounds selected from the group consisting of an organic peroxide, an organic azo compound and mixtures thereof suspended in a stabilizing vehicle and wherein the internal surface coating is of a paraffin wax or halogenated paraffin wax.

7. The package of claim 6 wherein the polymer formulation is a polyester resin formulation and the solvent component is a vinyl monomer.

8. The package of claim 7 wherein the stabilizing vehicle is mineral oil.

9. The package of claim 6 wherein the thickness of the internal surface coating is sufficient to prevent penetration of the additives and stabilizing vehicle into the foamed polystyrene container.

10. The package of claim 9 wherein the thickness of the internal surface coating is from about 0.5 to about 3.0 mils.

11. A polystyrene package for introducing additives into polymer formulations containing at least one component which is a solvent for polystyrene, said package comprising.
    (a) a polystyrene foam container having
    (b) a lid, and
    (c) an internal surface coating of a material which is non-reactive with and resistant to the additives, but breaks down to a particulate form when the package is mixed with the polymer formulation, and containing
    (d) at least one additive for said polymer formulation.

12. A polystyrene package for introducing additives into polymer formulations containing at least one component which is a solvent for polystyrene, said package comprising
    (a) a polystyrene foam container and lid having
    (b) an internal surface coating of a material which also is soluble in the solvent component of the polymer formulation but is non-reactive with and resistant to the additives, and containing
    (c) at least one additive including a catalyst for said polymer formulation, said catalyst being dispersed in
    (d) an inert liquid vehicle which will not dissolve or react with the internal surface coating.

13. The package of claim 12 wherein the polymer formulation is a polyester resin formulation and the solvent component is a vinyl monomer.

14. The package of claim 13 wherein the solid catalyst is an organic peroxide or an organic azo compound, and the inert liquid vehicle is mineral oil.

15. The package of claim 12 wherein the internal surface coating is a paraffin wax or chlorinated paraffin wax coating.

16. A method of introducing additives, utilizing a package containing at least one sensitive catalysts dispersed in a stabilizing vehicle, into polymer formulations containing at least one component which is a solvent for the package, comprising the introduction into said polymer formulation of the package of any one of claims 12 through 15.

* * * * *